US008862665B2

(12) United States Patent
Murphy et al.

(10) Patent No.: US 8,862,665 B2
(45) Date of Patent: *Oct. 14, 2014

(54) AUTOMATED FILE DISTRIBUTION

(75) Inventors: Elissa E. S. Murphy, Seattle, WA (US); Ryan W. J. Waite, Redmond, WA (US); Jason Garms, Woodinville, WA (US); Douglas S. Cavit, Redmond, WA (US); Bo J. Rohlfsen, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/408,841

(22) Filed: Feb. 29, 2012

(65) Prior Publication Data

US 2012/0166542 A1 Jun. 28, 2012

Related U.S. Application Data

(63) Continuation of application No. 11/275,823, filed on Jan. 30, 2006, now Pat. No. 8,150,987.

(51) Int. Cl.
*G06F 15/16* (2006.01)

(52) U.S. Cl.
USPC .......................................... 709/204; 709/229

(58) Field of Classification Search
USPC ......................................................... 709/204
See application file for complete search history.

(56) References Cited

U.S. PATENT DOCUMENTS 7,673,003 B2 * 3/2010 Little, II ........................ 709/206
7,904,511 B2 * 3/2011 Ryan et al. ..................... 709/204
8,150,987 B2 * 4/2012 Murphy et al. ................ 709/230
8,190,681 B2 * 5/2012 Markus et al. ................ 709/204
2002/0156917 A1 10/2002 Nye
2002/0184310 A1 12/2002 Traversat et al.
2003/0046097 A1 3/2003 LaSalle et al.
2003/0070070 A1 * 4/2003 Yeager et al. ................. 713/157

(Continued)

FOREIGN PATENT DOCUMENTS

JP 2002298007 A 10/2002
JP 2003223394 A 8/2003

(Continued)

OTHER PUBLICATIONS

The Japanese Office Action mailed May 12, 2011 for Japanese Patent Application No. 2008-553235, a counterpart foreign application of U.S. Appl. No. 11/275,823, _pages.
Office Action for U.S. Appl. No. 11/275,823, mailed on Apr. 4, 2011, Elissa E.S. Murphy, "Automated File Distribution".
PCT extended European search report No. PCT US2006049643, mailed Feb. 19, 2010, 6 pages.
Wada, "Proposal to Enlargement of P2P Community with Privacy Considered", Oct. 24, 2003, vol. 2003, No. 106, p. 105.

*Primary Examiner* — Lynn Feild
*Assistant Examiner* — Timothy Sowa
(74) *Attorney, Agent, or Firm* — Bryan Webster; Andrew Sanders; Micky Minhas

(57) ABSTRACT

Automated file distribution is described. A member of a peer-to-peer network receives from a file server, a file to be distributed. The file is then distributed via the peer-to-peer network to other members of the peer-to-peer network. Members of the peer-to-peer network can choose whether or not to receive a file from another member based on a trust level or reputation associated with the member. The trust level may be based, at least in part, on a number of degrees of separation between the members. Furthermore the file is verified, for example, by validating a digital signature associated with the file.

20 Claims, 7 Drawing Sheets

(56) References Cited

U.S. PATENT DOCUMENTS

| | | |
|---|---|---|
| 2003/0144958 A1 | 7/2003 | Liang et al. |
| 2003/0204605 A1 | 10/2003 | Hudson et al. |
| 2004/0088646 A1 | 5/2004 | Yeager et al. |
| 2005/0015466 A1 | 1/2005 | Tripp |
| 2005/0076137 A1 | 4/2005 | Tang et al. |
| 2005/0076240 A1 | 4/2005 | Appleman |
| 2005/0086300 A1* | 4/2005 | Yeager et al. ............... 709/204 |
| 2005/0171955 A1* | 8/2005 | Hull et al. .................. 707/10 |
| 2006/0190536 A1* | 8/2006 | Strong et al. ............... 709/204 |
| 2006/0224670 A1 | 10/2006 | Kubota |
| 2006/0259957 A1* | 11/2006 | Tam et al. .................. 726/3 |
| 2007/0180078 A1 | 8/2007 | Murphy et al. |
| 2011/0113113 A1* | 5/2011 | Ryan et al. ................ 709/206 |

FOREIGN PATENT DOCUMENTS

| | | |
|---|---|---|
| JP | 2003244416 A | 8/2003 |
| JP | 2003271316 A | 9/2003 |
| JP | 2004013283 A | 1/2004 |
| JP | 2005260595 A | 9/2005 |
| JP | 2005317028 A | 11/2005 |
| KR | 20010078821 A | 8/2001 |
| KR | 20020068234 A | 8/2002 |
| WO | WO0215035 A2 | 2/2002 |
| WO | WO2005107218 A1 | 11/2005 |

* cited by examiner

AUTOMATED FILE DISTRIBUTION

RELATED APPLICATION

This application is a continuation of U.S. patent application Ser. No. 11/275,823, filed on Jan. 30, 2006, the disclosure of which is incorporated by reference herein.

BACKGROUND

Costs associated with operating a web-based product service can increase significantly as users are added to the service. Such costs can include bandwidth, electricity, and facilities. One key component of many product services is the updating of files associated with a product or service, in order to maintain the highest quality experience possible for the users. Update services typically provide an online service from which the latest files for associated products and services can be downloaded. Reducing the cost of distributing update files would benefit many such services.

SUMMARY

This Summary is provided to introduce a selection of concepts in a simplified form that are further described below in the Detailed Description. This Summary is not intended to identify key features or essential features of the claimed subject matter, not is it intended to be used as an aid in determining the scope of the claimed subject matter.

Techniques for automated file distribution are described. Within a peer-to-peer network, a first level of a user's social network is determined based on other users identified in a contact list associated with the user. Contact lists associated with those users are used to identify additional members of the user's social network. The social network may be limited to any number of such iterations.

Trust levels may be assigned to members of a peer-to-peer network that are part of a user's social network. Trust levels may be based, at least in part, on how far a particular member is removed from the user within the social network.

Files may be distributed between members of the peer-to-peer network, based, at least in part, on trust levels associated with various members of the peer-to-peer network. When a file is available to a user from another member of the peer-to-peer network, a trust level associated with the other member is evaluated to determine whether or not the user will receive the file. Once a file is received a verification of the file may be performed (e.g., validating a digital signature) to verify that the file has not been tampered with.

DETAILED DESCRIPTION

The embodiments described below provide techniques for automated file distribution. A file (typically, but not limited to, a product or service update file) is downloaded from an update service to a client device that is part of a peer-to-peer network. One example of a peer-to-peer network is an instant messaging network, such as Microsoft Corporation's MSN Messenger. The update file that was downloaded may then be automatically distributed to other client devices via the peer-to-peer network. In an exemplary implementation, a reputation associated with the distributing user and a digital signature associated with the file are used to ensure receipt via the peer-to-peer network of valid update files.

Figure 1:
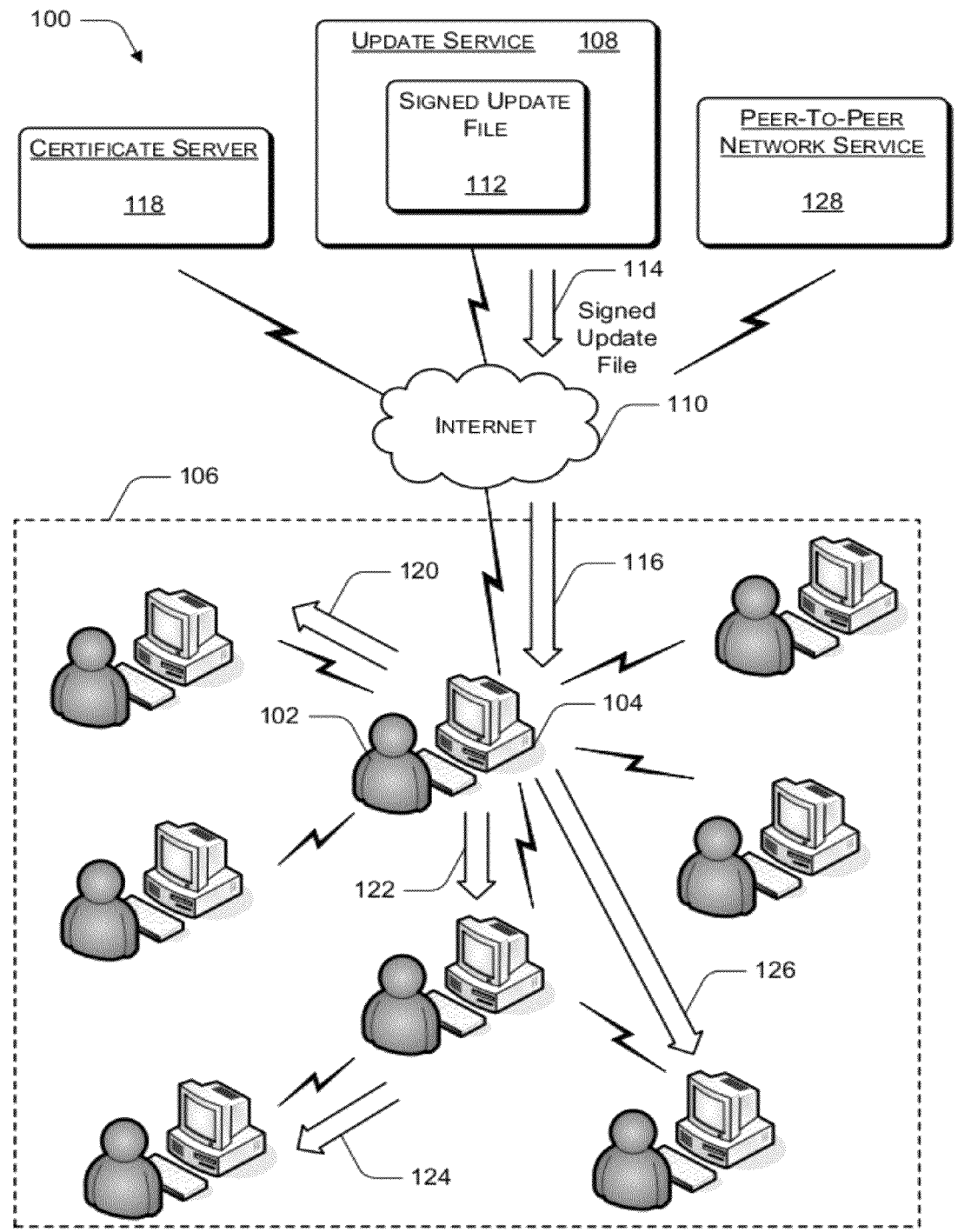
FIG. 1 is a pictorial diagram that illustrates an exemplary network environment in which automated file distribution may be implemented.

FIG. 1 illustrates an exemplary network environment in which automated file distribution may be implemented. A user 102 uses a client device 104 to connect to a peer-to-peer network 106. Although illustrated as a personal computer, client device 104 (and each of the other client devices within peer-to-peer network 106) is representative of any type of client device capable of receiving an update file from update service 108 and interacting with other client devices via peer-to-peer network 106. Such client devices may include, but are not limited to, personal computers, laptop computers, Internet-enabled personal digital assistants (PDAs), Internet-enabled cell phones, smart phones, and so on.

Client device 104 is configured to access a content delivery network (e.g., by pinging update service 108, for example via the Internet 110) to determine whether or not an update file is available. Any number of types of update files may be available, such as, but not limited to, operating system update files, software application update files, virus engine update files, virus signature update files, and so on. In response to the ping, update service 108 sends update file 112 to client device 104, as indicated by arrows 114 and 116. In an exemplary implementation, update file 112 is digitally signed to provide a mechanism by which the authenticity of the update file can be verified, for example, via a public key infrastructure (PKI). A certificate server 118 may be implemented to support update file signing and verification.

After client device 104 receives the update file 112, the update file may be distributed to one or more other client devices associated with other users via the peer-to-peer network 106, as illustrated by arrows 120, 122, 124, and 126. In an exemplary implementation, the update file is transmitted through the peer-to-peer network 106 with the digital signature so that client devices receiving the update file via the peer-to-peer network can verify that the received file is the same as the original copy provided by the update service.

Additionally, user 102 has an associated reputation that may be considered by other users within peer-to-peer network 106 to determine whether or not to receive the update file being distributed from client device 104. In an exemplary implementation, a degree to which one user trusts another user may be based, at least in part, on a relationship between those users within a peer-to-peer network. In alternate implementations, a third-party reputation service may be consulted to determine a level to which a particular user can be trusted, or a combination of reputation data from any number of sources which may include one or more reputations services may be used to determine a level to which a particular user can be trusted.

Peer-to-peer network service 128 is implemented to facilitate direct connections between members of peer-to-peer network 106. Select components of an exemplary peer-to-peer network service 128 are described in further detail below with reference to FIG. 4.

Figure 2:
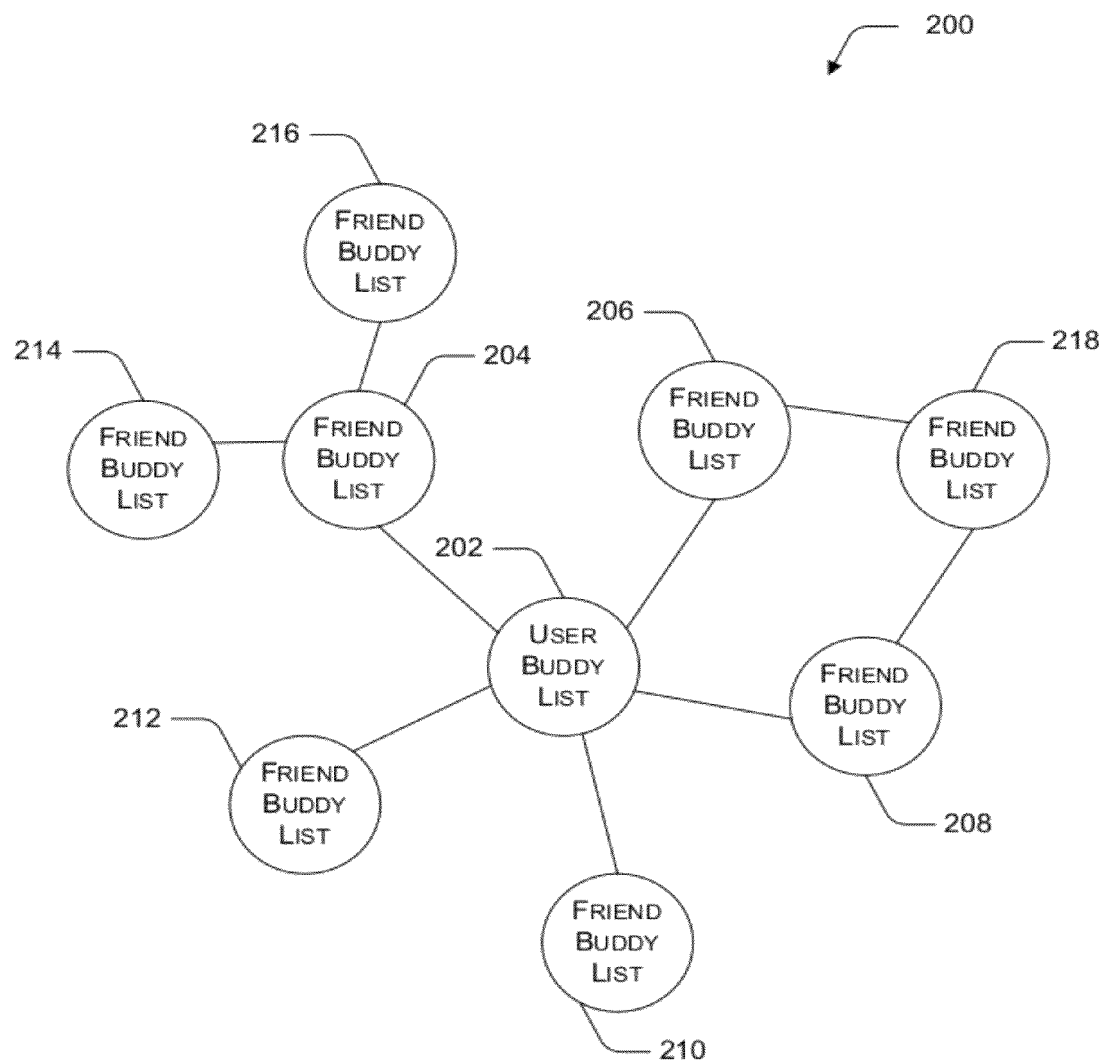
FIG. 2 is a block diagram that illustrates an exemplary peer-to-peer social network that may be associated with a particular user.

FIG. 2 illustrates exemplary relationships within a peer-to-peer network 200. In a typical peer-to-peer network (e.g., an instant messaging network), a user invites other users to be members of a contact list 202 (also referred to herein as a "buddy list") that identifies friends of the user by email address or other identifying information. Those friends may also have buddy lists. For example, user buddy list 202 may identify five friends of the particular user. Those friends may also have buddy lists, represented by friend buddy lists 204, 206, 208, 210, and 212. Similarly, individuals identified in friend buddy lists 204, 206, 208, 210, and 212 may also have buddy lists. For example, two individuals identified in friend buddy list 204 may have buddy lists, represented by friend buddy lists 214 and 216. Similarly, an individual identified in both friend buddy list 206 and friend buddy list 208 may have a buddy list, represented by friend buddy list 218.

In an exemplary implementation, buddy lists represent trusted relationships in that a user can be added to another user's buddy list by invitation only. As such, if one user is identified in another user's buddy list, a certain level of trust between the two users can be assumed. Furthermore, some degree of trust may exist between a user and a friend of a friend. A user's friends, friends of friends, and so on, can be thought of as a user's social network.

Furthermore, members of a user's buddy list may be grouped in various, user-defined ways. For example, a user may have a group of buddies who are work contacts, a group of buddies who are friends, and a group of buddies who are family.

Figure 3:
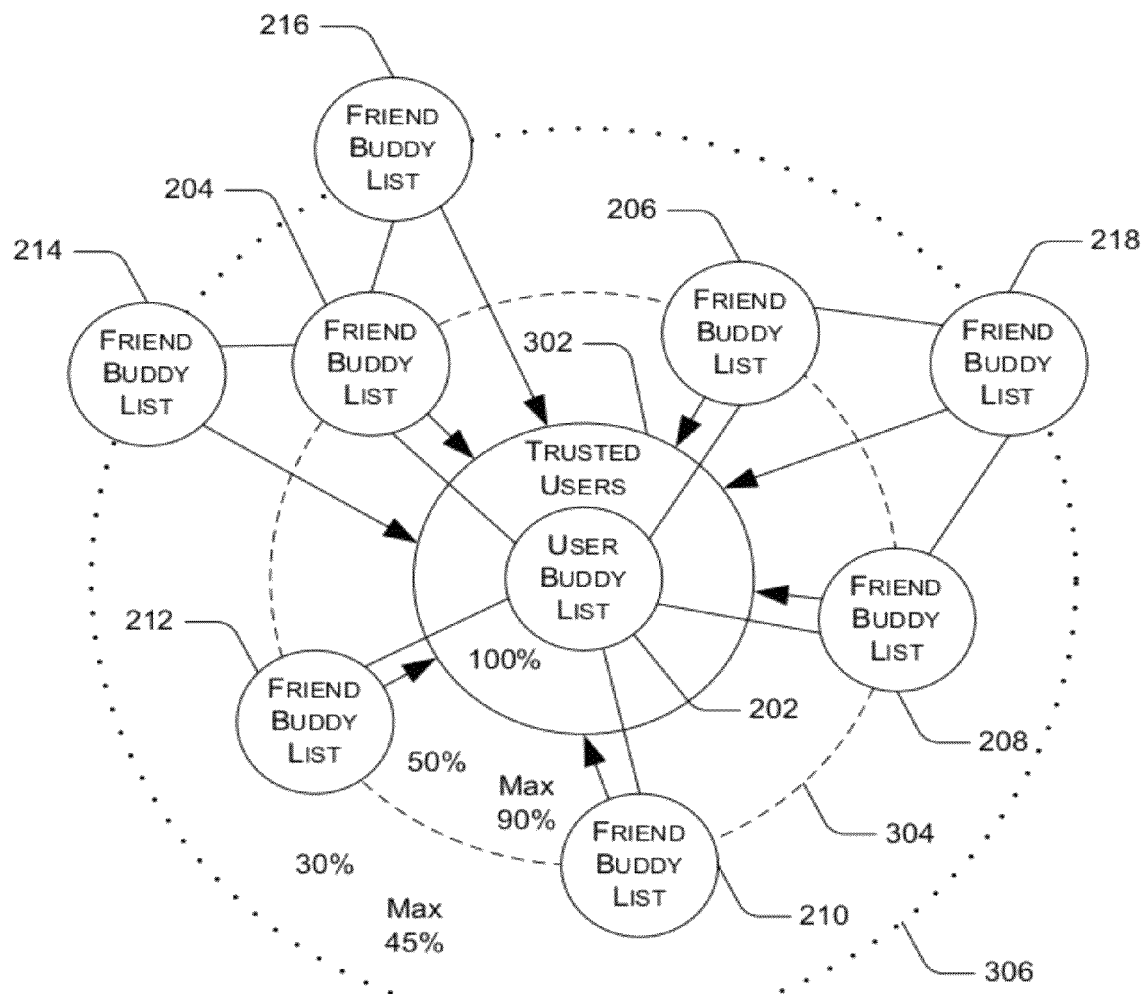
FIG. 3 is a block diagram that illustrates an exemplary way in which trust levels may be applied to elements of the social network illustrated in FIG. 2.

FIG. 3 illustrates example trust levels that may be associated with users identified in buddy lists that are part of a user's social network. In an exemplary implementation, trust levels are associated with users that are identified in the various buddy lists belonging to the user, friends of the user, and friends of friends of the user. The trust levels are established to help determine how confident a user should be that a received file is valid. For example, files received from friends that are identified in user buddy list 202 are highly trusted, while files received from users that are identified in more distant friend buddy lists (e.g., friend buddy lists 214, 216, or 218) may be less trusted.

In an exemplary implementation, a user's social network may be described in terms of degrees of separation. For example, friends specified in the user's buddy list 202 are zero degrees separated from the user. Individuals specified in buddy lists that belong to the friends who are specified in the user's buddy list 202 are one degree separated from the user. Buddy lists 204, 206, 208, 210, and 212 each belong to an individual that is identified in the user's buddy list 202, and thus, are each one-degree removed from the user. Similarly, buddy lists 214 and 216 are associated with individuals who are identified in buddy list 204, and buddy list 218 is associated with an individual who is identified in both buddy list 206 and buddy list 208. Thus, friend buddy lists 214, 216, and 218 are two-degrees removed from the user. Although only two degrees of separation are illustrated, any number of degrees of separation may be defined for a particular user's social network.

In an exemplary implementation, each degree of separation has an associated trust level. For example, those users identified in the user buddy list 202 are zero-degrees removed, and are 100% trusted. Therefore, trusted users circle 302 includes all of the users identified in user buddy list 202. Dashed line 304 represents those buddy lists that are one-degree removed from the user. In the illustrated example, individuals identified in the one-degree removed buddy lists (e.g., friend buddy lists 204, 206, 208, 210, and 212) are assigned a 50% trust level. Similarly, dotted line 306 represents those buddy lists that are two-degrees removed from the user. In the illustrated example, individuals identified in the two-degrees removed buddy lists (e.g., friend buddy lists 214, 216, and 218) are assigned a 30% trust level.

The trust levels described herein are given only as an illustration. It is recognized that any number of different methods may be used for determining a trust level associated with a particular individual. For example, reputation data from one or more sources, which may include one or more reputation systems or services may also be used to determine a trust level associated with a particular individual. Furthermore, trust levels may be assigned to file types such that, for example, digitally signed update files may be more trusted, by default, than other files such as pictures or music.

In the described implementation, trust levels are assigned to individuals that are added to the trusted friends circle 302 from the various degrees of separation. In addition, a trust level associated with a particular individual may be increased if the individual is found multiple times. For example, if a particular individual is not identified in user buddy list 202, but is identified in three friend buddy lists that are one-degree removed from the user (e.g., friend buddy lists 208, 210, and 212), then that particular individual may be assigned a trust level equal to 150% (i.e., 50%+50%+50%; one rating of 50% for each one-degree removed friend buddy list in which the individual is identified).

However, to prevent an individual that is not identified in the user buddy list 202 from being assigned a trust level greater than 100%, each degree of separation may have an associated maximum trust level. For example, one-degree of separation may have a maximum trust level of 90% and two-degrees of separation may have a maximum trust level of 45%. Given these maximums, an individual that is not identified in user buddy list 202 cannot be assigned a trust level greater than 90%. Similarly, an individual that is not identified in user buddy list 202 or friend buddy lists 204, 206, 208, 210, or 212 (but is stored in at least one of friend buddy lists 214, 216, or 218) cannot be assigned a trust level greater than 45%.

In the described exemplary implementation, the maximum default trust level allowed for a particular individual is determined by the closest degree of separation in which the individual is identified. For example, an individual that is identified in friend buddy list 214, friend buddy list 216, and friend buddy list 218 may be assigned a trust level of 45% (30% from buddy list 214+30% from buddy list 216+30% from buddy list 218=90%, but the maximum for two-degrees removed is 45%). On the other hand, an individual that is identified in friend buddy list 212, friend buddy list 214, and friend buddy list 218 may be assigned a trust level of 90% (50% from buddy list 212+30% from buddy list 214+30% from buddy list 218=110%, but the maximum for one-degree removed is 90%).

In an exemplary implementation, a user can specify a degree to which files received from friends' friends are to be trusted. For example, if a user specifies a zero-degree trust, then only files received from individuals specified in the user buddy list 202 are trusted; if a user specifies a one-degree trust, then files received from individuals specified in the user buddy list 202 or files received from individuals specified in buddy lists that are one-degree removed from the user buddy list 202 (e.g., buddy lists 204, 206, 208, 210, and 212) are trusted. Furthermore, in an alternate implementation, a user may be allowed to override trust levels associated with one or more individuals or certificate owners such that, for example, any files received from a particular user are always trusted, any files received from a particular user a never trusted, any files having a particular certificate are always trusted, or any files having a particular certificate are never trusted. Additionally, an alternate implementation may enable a user to approve or disapprove a file after the file has been downloaded. In this way, the file is downloaded, but is not installed until the user approves the download.

In an alternate implementation, a user may also be allowed to specify the trust level to be applied to individuals that are separated from the user by various degrees. For example, a default setting may assign a 50% trust level to individuals that are one-degree removed from the user, but the user may be allowed to override that setting to assign, for example, a 70% trust level to individuals that are one-degree removed from the user. Similarly, in an alternate implementation, a user may be allowed to customize a maximum trust level associated with various degrees of separation. For example, a default setting may enforce a maximum trust level of 90% for individuals that are one-degree removed from a user, but the user may be allowed to override the default to assign a maximum trust level of 99% for individuals that are on-degree removed from a user. Furthermore, a user may be allowed to override default trust levels for certain individuals. For example, a friend identified in the user's buddy list may, for one reason or another, not be very trusted. Accordingly, the user may specify a 0% (or some other number) trust level for that particular friend.

Additionally, different default trust levels may be assigned to different groups of buddies. For example, a user's work contacts group may be highly trusted, while the user's friends group may be less trusted. In an alternate implementation, trust associated with a particular individual identified in a user's buddy list may be based on a certificate received from that individual.

Figure 4:
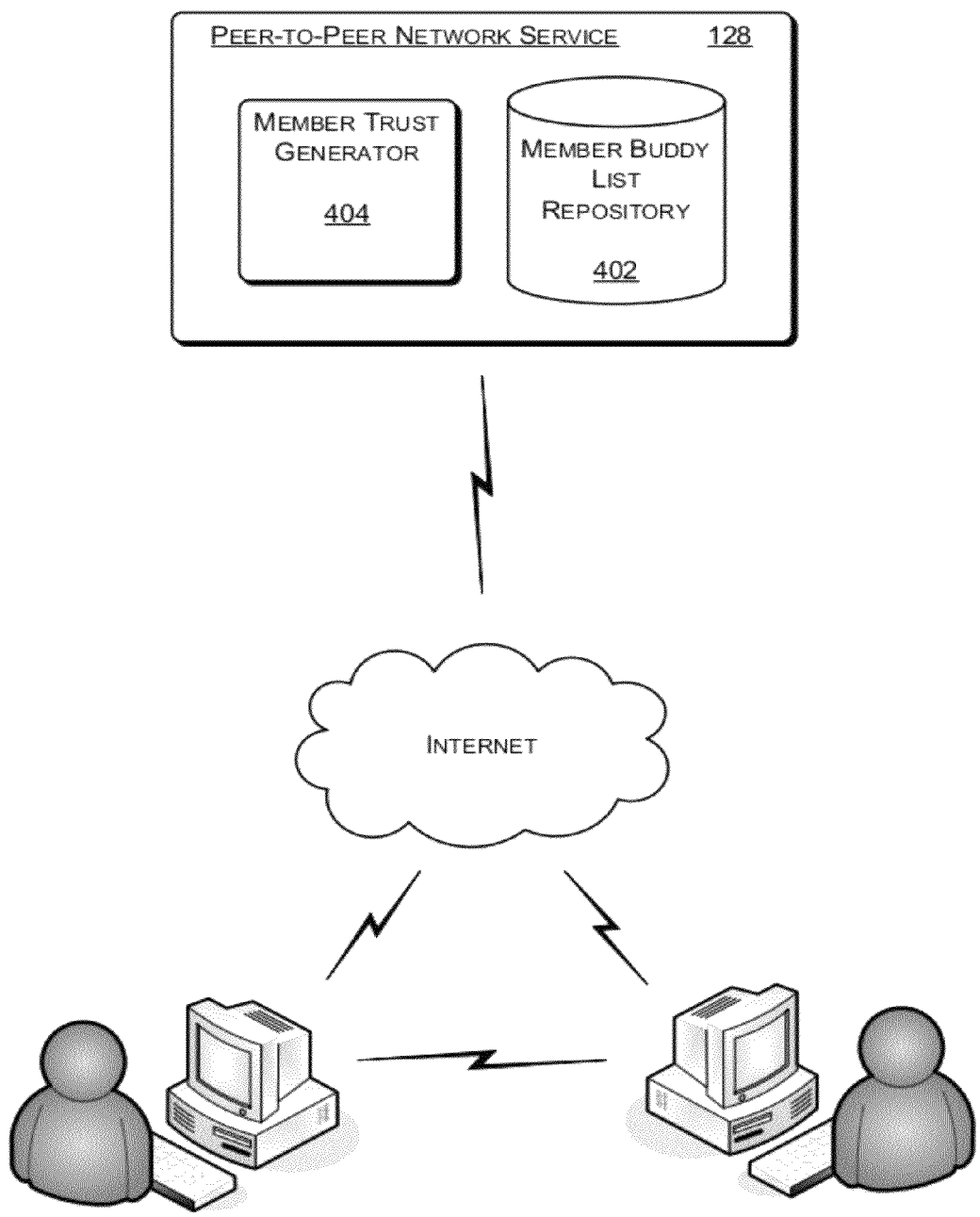
FIG. 4 is a block diagram that illustrates select components of an exemplary peer-to-peer network service.

FIG. 4 illustrates select components of an exemplary peer-to-peer network service 128, which includes member buddy list repository 402 and member trust generator 404. Member buddy list repository 402 maintains, for each member of a peer-to-peer network, a buddy list that identifies other members of the peer-to-peer network with whom the member is willing communicate. Member trust generator 104 determines and/or maintains, for each member of the peer-to-peer network, trust levels associated with the one or more other members of the peer-to-peer network. In an exemplary implementation, trust levels are based, at least in part, on degrees of separation between members, as illustrated in and described above with reference to FIG. 3. As described above, trust levels may also be based on other criteria (e.g., a certificate associated with an individual).

Methods for implementing automated file distribution may be described in the general context of computer executable instructions. Generally, computer executable instructions include routines, programs, objects, components, data structures, procedures, and the like that perform particular functions or implement particular abstract data types. The methods may also be practiced in a distributed computing environment where functions are performed by remote processing devices that are linked through a communications network. In a distributed computing environment, computer executable instructions may be located in both local and remote computer storage media, including memory storage devices.

Figure 5:
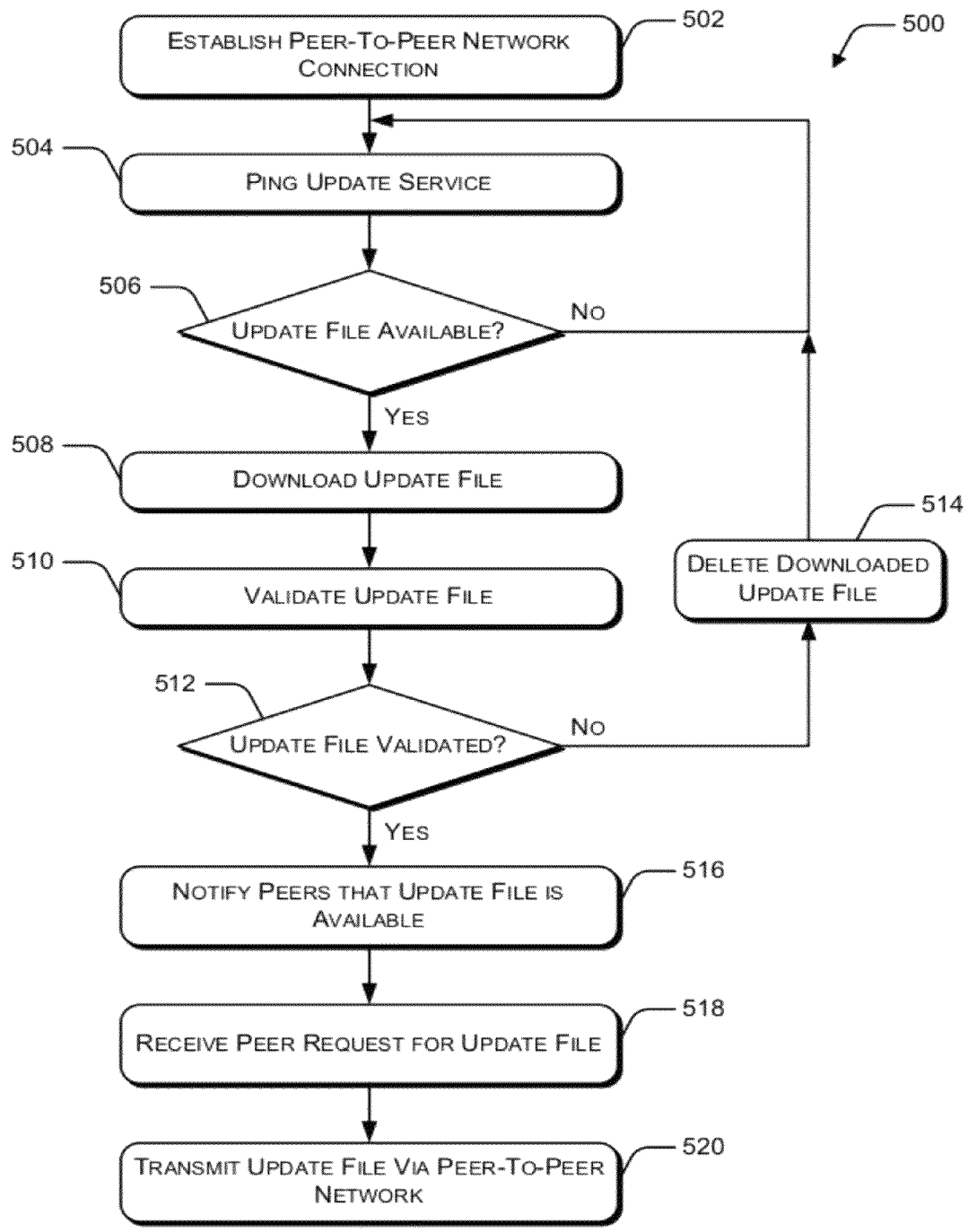
FIG. 5 is a flow diagram that illustrates an exemplary method for distributing a file via a peer-to-peer network.
Figure 6:
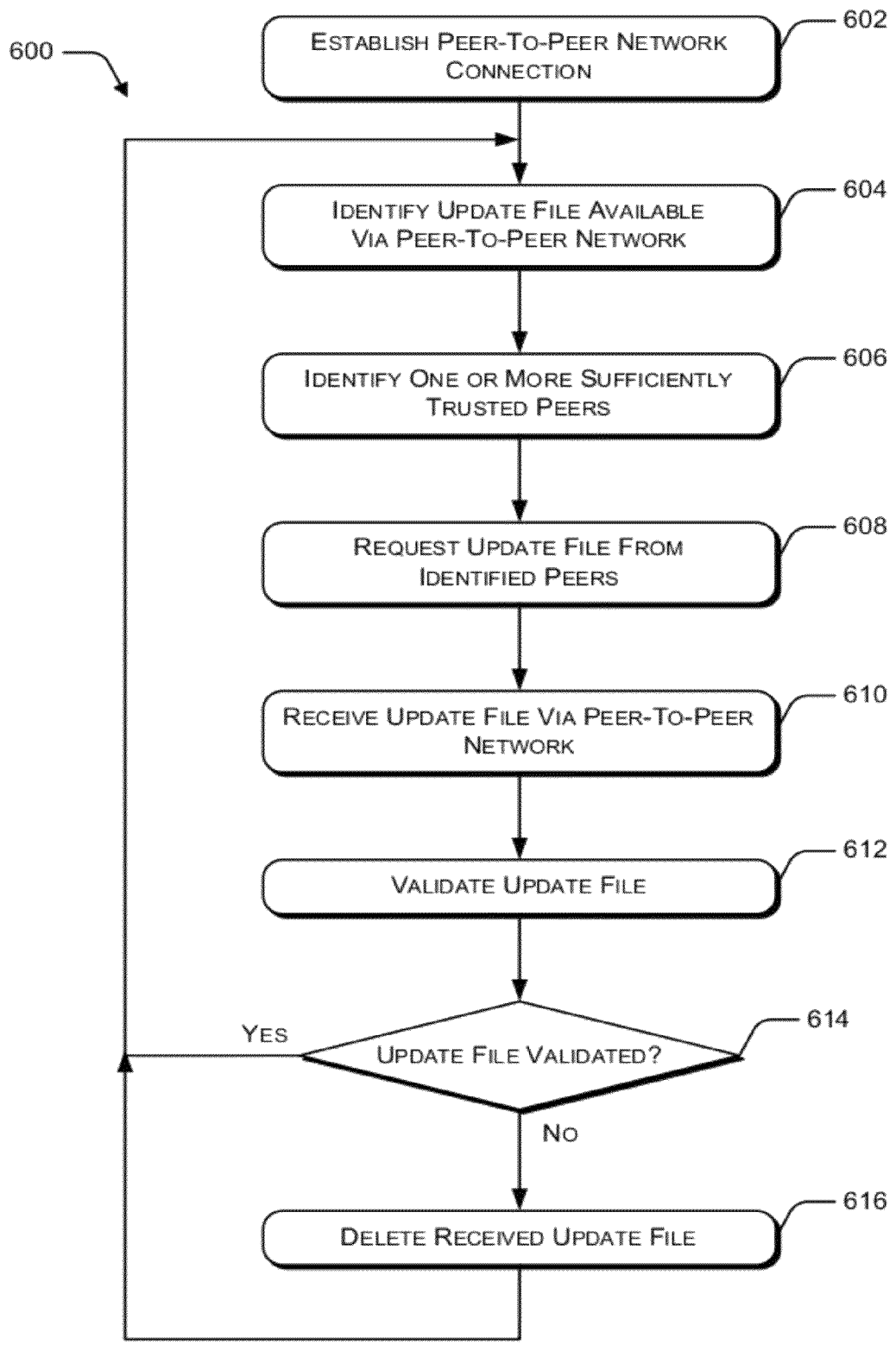
FIG. 6 is a flow diagram that illustrates an exemplary method for receiving a file via a peer-to-peer network.
Figure 7:
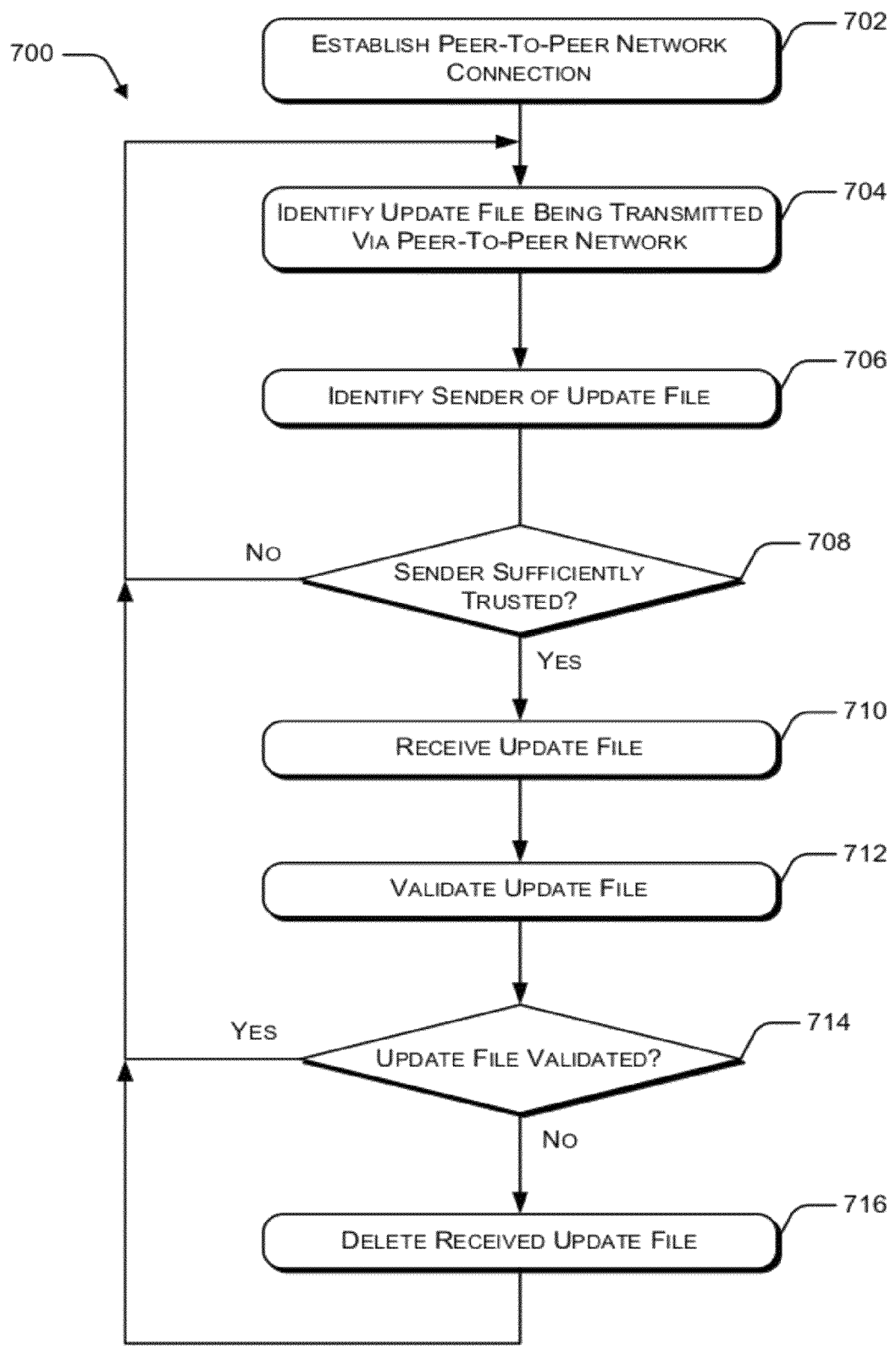
FIG. 7 is a flow diagram that illustrates an exemplary method for receiving a file via a peer-to-peer network.

FIGS. 5-7 illustrate exemplary methods for automated file distribution. FIGS. 5-7 are specific examples of automated file distribution, and are not to be construed as limitations. The order in which the method blocks are described is not intended to be construed as a limitation, and any number of the described method blocks can be combined in any order to implement the methods. Furthermore, the methods can be implemented in any suitable hardware, software, firmware, or combination thereof.

FIG. 5 is a flow diagram that illustrates an exemplary method 500 for automatically distributing a file via a peer-to-peer network. At block 502, a connection to a peer-to-peer network is established. For example, user 102 may use client device 104 to connect to peer-to-peer network 106, as illustrated in FIG. 1.

At block 504, an update service (or other type of content delivery network) is contacted. For example, client device 104 pings update service 108 to determine whether or not any new update files are available.

At block 506, it is determined whether or not an update file is available. For example, update service, may provide client device 104 with a list of available update files, and client device 104 may compare the available files with files already stored on client device 104 to determine if any of the available files are newer than the files already stored. Any number of file characteristics may be used to determine whether or not an available file is newer than an existing file. Such file characteristics may include, but are not limited to, a file checksum, a filename, a file version, a date/time, a file length, and/or a digital signature.

If it is determined that no update files are available (the "No" branch from block 506), then processing may either terminate (not shown), or may continue as described above with reference to block 504. On the other hand, if it is determined that an update file is available (the "Yes" branch from block 506), then at block 508, the update file is downloaded. For example, client device 104 requests the update file, and update service 108 transmits the update file via the Internet.

At block 510, the update file is validated. For example, client device 104 utilizes a public key infrastructure (PKI) via certificate server 118 to validate a digital signature associated with the downloaded update file, to verify that the received file was not altered during transmission.

At block 512, it is determined whether or not the downloaded update file was validated. If the update file was not validated (the "No" branch from block 512), then at block 514, the file is deleted, and processing either terminates (not shown), or continues as described above with reference to block 504.

On the other hand, if it is determined that the downloaded update file has been validated (the "Yes" branch from block 512), then at block 516, peers are notified that the update file is available via the peer-to-peer network. For example, client device 104 automatically distributes notifications via the peer-to-peer network 106. Any number of default and/or user-defined policies may be implemented to define how such notifications are distributed. For example, notifications may be sent only to those individuals who are identified in the user's buddy list. Alternatively, notifications may be sent to individuals identified up to two, three, or some other specified number, of degrees of separation from the user. In another implementation, notifications may be sent to users based on trust levels associated with those users. In an alternate implementation, rather than sending a notification, the file itself may be automatically distributed at this point to one or more individuals via the peer-to-peer network. For example, update files may be automatically distributed to everyone identified as a member of a specific group of buddies (e.g., a work contacts group).

At block 518, a peer request for the update file is received. For example, client device 104 receives a request for the update file via peer-to-peer network 106.

At block 520, the update file is transmitted via the peer-to-peer network. For example, in response to the received request, client device 104 transmits the signed update file via the peer-to-peer network to the requestor. In an alternate implementation, the update file may be automatically transmitted via the peer-to-peer network for receipt by one or more users without waiting for a request from those users (i.e., block 518 is optional in some implementations).

FIG. 6 is a flow diagram that illustrates an exemplary method 600 for receiving a file automatically distributed via a peer-to-peer network. At block 602, a connection to a peer-to-peer network is established. For example, a user may use a client device to connect to peer-to-peer network 106.

At block 604, an update file that is available via the peer-to-peer network is identified. For example, the user's client device may receive a notification from another user via the peer-to-peer network, indicating that the update file is available. Alternatively, the user's client device may receive a response to a ping to another client device via the peer-to-peer network, inquiring as to whether or not an update file is available.

At block 606, one or more sufficiently trusted peers are identified. Any number of techniques may be implemented for identifying trusted peers, and the examples described herein are not intended to be construed as limitations. In an exemplary implementation, a third-party reputation service may by consulted to identify peers with a sufficient reputation. Alternatively, users within the user's social network may be identified based on trust levels associated with those users, for example, as described above with reference to FIG. 3. In addition to trust level and/or reputation, peers may be identified based on automatically detected network traffic (e.g., selecting those peers with the least network traffic), latency with response to a ping (e.g., selecting those peers with the quickest response time), location based on an IP-to-geographic mapping (e.g., selecting those peers with the closest proximity), and/or other variables.

At block 608, the update file is requested from the identified one or more peers.

At block 610, the update file is received. For example, a user's client device receives an update file that was transmitted via the peer-to-peer network.

At block 612 the received update file is validated. For example, in an exemplary implementation, the received file includes a digital signature or other type of data that can be used to validate the update file.

At block 614 it is determined whether or not the update file was validated. If the update file is successfully validated (the "Yes" branch from block 614), then processing continues as described above with reference to block 604. On the other hand, if the update file is not successfully validated (the "No" branch from block 614), then at block 616, the received update file is deleted, and processing continues as described above with reference to block 604.

FIG. 7 is a flow diagram that illustrates an exemplary method 700 for receiving a file automatically distributed via a peer-to-peer network. At block 702, a connection to a peer-to-peer network is established. For example, a user may use a client device to connect to peer-to-peer network 106.

At block 704, an update file that is being transmitted via the peer-to-peer network is identified. For example, the user's client device may detect an update file that is being transmitted and is available for the client device to receive.

At block 706, a sender of the update file is identified. For example, the user's client device examines data associated with the update file that is being transmitted to identify an individual responsible for sending the update file.

At block 708, it is determined whether or not the sender of the update file is sufficiently trusted. For example, as described above with reference to FIG. 3, various trust levels may be assigned to individuals within a user's social network. Depending on whether or not the sender of the update file is within the user's social network, and if so, the sender's position within the user's social network, the sender may or may not be deemed sufficiently trusted. In an alternate implementation, trust of a sender may be based on other characteristics, such as, but not limited to, a third party certification authority, feedback from users that rate the sender or machine reputation, or a sender reputation service that provides some representation of a user's reputation.

If it is determined that the sender is not sufficiently trusted (the "No" branch from block 708), then processing continues as described above with reference to block 704. On the other hand, if it is determined that the sender is sufficiently trusted (the "Yes" branch from block 708), then at block 710, the update file is received. For example, the user's client device accepts the transmission containing the update file via the peer-to-peer network. In an exemplary implementation, a notification may be presented to the user indicating that the file download is about to take place, and the user may be given an option to cancel the download, so that the file will not be received. Furthermore, the user interface may include a settings area in which the user can specify how or if such notifications are to be presented.

At block 712 the received update file is validated. For example, in an exemplary implementation, the received file includes a digital signature or other type of data that can be used to validate the update file.

At block 714 it is determined whether or not the update file was validated. If the update file is successfully validated (the "Yes" branch from block 714), then processing continues as described above with reference to block 704. On the other hand, if the update file is not successfully validated (the "No" branch from block 714), then at block 716, the received update file is deleted, and processing continues as described above with reference to block 704.

Although embodiments of automated file distribution have been described in language specific to structural features and/or methods, it is to be understood that the subject of the appended claims is not necessarily limited to the specific features or methods described. Rather, the specific features and methods are disclosed as exemplary implementations of automated file distribution.

The invention claimed is:

1. One or more computer readable memory storage devices encoded with instructions that, when executed, direct a computing device to perform operations comprising:

establishing communication through a peer-to-peer network, between the computing device and members of the peer-to-peer network, whereby the computing device is a peer member of the peer-to-peer network, wherein each particular member of the peer-to-peer network, including the computing device, has an associated social network list that identifies other members of the peer-to-peer network that are fully trusted by the particular member of the peer-to-peer network;

determining through communication between the computing device and the members of the peer-to-peer network, that a particular file is available through the peer-to-peer network from a plurality of the members of the peer-to-peer network;

selecting a fully trusted member of the peer-to-peer network based, at least in part, on determining if a member of the peer-to-peer network that has the particular file is on the social network list associated with the computing device;

if a member of the peer-to-peer network that has the particular file is on the social network list associated with the computing device, receiving the particular file through the peer-to-peer network from the member of the peer-to-peer network that has the particular file and is on the social network list associated with the computing device; and if no member of the peer-to-peer network that has the particular file is on the social network list associated with the computing device:

ascertaining a degree of separation from the computing device for each member in the peer-to-peer network that has the particular file available for distribution;

for each member in the peer-to-peer network that has the particular file available for distribution, ascertaining a number of other members of the peer-to-peer network that fully trust the member that has the particular file available for distribution as evidenced by the member that has the particular file available for distribution being listed in the social network lists associated with the other members of the peer-to-peer network;

assigning a trust level for each member in the peer-to-peer network that has the particular file available for distribution, wherein the trust level is based, at least in part, on the ascertained degree of separation from the computing device and the number of other members of the peer-to-peer network that fully trust the member that has the particular file available for distribution;

selecting a particular member of the peer-to-peer network that has a highest assigned trust level; and receiving the particular file from the particular member that has the highest assigned trust level through the peer-to-peer network.

2. The one or more computer readable memory storage devices as recited in claim 1, wherein selecting the fully trusted member of the peer-to-peer network is further based, at least in part, on an automatically detected level of network traffic associated with the fully trusted member of the peer-to-peer network compared to an automatically detected level of network traffic associated with another particular member of the peer-to-peer network.

3. The one or more computer readable memory storage devices as recited in claim 1, wherein selecting the fully trusted member of the peer-to-peer network is further based, at least in part, on results of a network latency test.

4. The one or more computer readable memory storage devices as recited in claim 1, wherein selecting the fully trusted member of the peer-to-peer network is further based, at least in part, on a geographic location associated with the fully trusted member of the peer-to-peer network compared to a geographic location associated with another particular member of the peer-to-peer network.

5. The one or more computer readable memory storage devices as recited in claim 1, wherein the trust level rating associated with each member of the peer-to-peer network is further based on reputation data obtained from a reputation service.

6. The one or more computer readable memory storage device as recited in claim 1, wherein the trust level rating associated with each member of the peer-to-peer network is further based on a certificate associated with each member of the peer-to-peer network.

7. A system, comprising:

one or more computer readable memory storage devices comprising a member contact list repository to maintains, for each respective member of a peer-to-peer network, a contact list that identifies other members of the peer-to-peer network that are fully trusted by the respective member of the peer-to-peer network; and the one or more computer readable memory storage devices encoded with instructions that, when executed, perform operations comprising determining, for a first member of the peer-to-peer network, a trust level to be associated with other members of the peer-to-peer network, the trust level for a second member of the peer-to-peer network being based, at least in part, on a degree of separation between the first member of the peer-to-peer network and the second member within the peer-to-peer network and a number of other members of the peer-to-peer network that are fully trusted by the second member.

8. The system of claim 7, wherein the trust level for the second member of the peer-to-peer network is further based on a certificate associated with the second member.

9. The system of claim 7, wherein the trust level for the second member of the peer-to-peer network is further based on reputation data obtained from a reputation service.

10. The system of claim 7, wherein the trust level for each member of the peer-to-peer network is accessed by a file sharing service.

11. The system of claim 7, wherein the first member of the peer-to-peer network distributes a file to the second member of the peer-to-peer network based on the trust level associated with the second member.

12. The system of claim 11, wherein the first member of the peer-to-peer network automatically distributes the file to the second member of the peer-to-peer network based on the trust level associated with the second member.

13. The system of claim 7, wherein the other members of the peer-to-peer network choose whether or not to receive a file from the first member of the peer-to-peer network based on the trust level associated with the first member of the peer-to-peer network.

14. The system of claim 7, wherein the first member evaluates the trust level associated with each member of the peer-to-peer network prior to sharing a file with each member of the peer-to-peer network.

15. One or more computer readable memory storage devices encoded with instructions that, when executed, direct a computing device to perform operations comprising:

automatically sending notifications from a member of a peer-to-peer network directly to additional members of the peer-to-peer network based on a trust rating for each additional member of the peer-to-peer network, where determining the trust rating for each additional member comprises:

ascertaining a degree of separation from the member of the peer-to-peer network for each additional member of the peer-to-peer network;

ascertaining a number of times each member of the peer-to-peer network is listed in a social network contact list associated with other members of the peer-to-peer network, the social network contact list for each particular member of the peer-to-peer network identifying members of the peer-to-peer network that are fully trusted by the particular member of the peer-to-peer network; and assigning a trust level for each additional member of the peer-to-peer network, wherein the trust level is based at least on the ascertained degree of separation for the additional member of the peer-to-peer network and the number of times a additional member appears in a social network contact list associated with the other members of the peer-to-peer network.

16. The one or more computer readable memory storage devices as recited in claim 15, the operations further comprising receiving by the first member of the peer-to-peer network, a file to be distributed.

17. The one or more computer readable memory storage devices as recited in claim 16, the operations further comprising distributing the file through the peer-to-peer network directly from the member of the peer-to-peer network to at least one additional members of the peer-to-peer network.

18. The one or more computer readable memory storage devices as recited in claim 16, wherein the first member of the peer-to-peer network receives the file from a fully trusted member of the peer-to-peer network.

19. The one or more computer readable memory storage devices as recited in claim 15, the operations further comprising:

receiving a request for a file via the peer-to-peer network, wherein the request is received by the first member of the peer-to-peer network directly from a second member of the peer-to-peer network; and distributing the file directly from the first member of the peer-to-peer network to the second member of the peer-to-peer network, via the peer-to-peer network in response to the request.

20. The one or more computer readable memory storage devices as recited in claim 15, wherein automatically sending notifications comprises sending notifications via the peer-to-peer network from the first member of the peer-to-peer network to each member of the peer-to-peer network having an assigned trust level exceeds a trust level threshold.

* * * * *